US010967912B2

(12) United States Patent
Toyota

(10) Patent No.: US 10,967,912 B2
(45) Date of Patent: Apr. 6, 2021

(54) VEHICLE LOWER SECTION STRUCTURE

(71) Applicant: Toyota Jidosha Kabushiki Kaisha, Toyota (JP)

(72) Inventor: Masaru Toyota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 63 days.

(21) Appl. No.: 16/405,170

(22) Filed: May 7, 2019

(65) Prior Publication Data

US 2019/0382051 A1 Dec. 19, 2019

(30) Foreign Application Priority Data

Jun. 13, 2018 (JP) .............................. JP2018-112974

(51) Int. Cl.
*B62D 25/02* (2006.01)
*B60J 5/06* (2006.01)
*B62D 25/20* (2006.01)
*B62D 21/15* (2006.01)
*B60K 1/04* (2019.01)

(52) U.S. Cl.
CPC ................ *B62D 25/02* (2013.01); *B60J 5/06* (2013.01); *B62D 21/157* (2013.01); *B62D 25/2036* (2013.01); *B60K 1/04* (2013.01); *B60K 2001/0438* (2013.01); *B60Y 2306/01* (2013.01)

(58) Field of Classification Search
CPC ........ B60J 5/06; B62D 21/157; B62D 25/025; B62D 25/02; B60K 1/04; B60K 2001/0438; B60Y 2306/01

USPC .......... 296/203.01, 203.03, 209, 204, 187.12
See application file for complete search history.

(56) References Cited

U.S. PATENT DOCUMENTS

| | | | |
|---|---|---|---|
| 6,328,374 B1 * | 12/2001 | Patel .......................... | B60J 5/06 296/155 |
| 7,611,190 B1 * | 11/2009 | Elliott ........................ | B60J 5/06 296/146.12 |
| 8,702,161 B2 * | 4/2014 | Charbonneau ....... | B62D 25/025 296/209 |
| 8,939,246 B2 * | 1/2015 | Yamaguchi .............. | B60K 1/04 180/68.5 |
| 2014/0326524 A1 * | 11/2014 | Ogushi ............... | H01M 2/1083 180/68.5 |
| 2017/0305250 A1 | 10/2017 | Hara | |
| 2018/0056752 A1 | 3/2018 | Ogawa et al. | |

FOREIGN PATENT DOCUMENTS

| | | |
|---|---|---|
| JP | 2013-067255 A | 4/2013 |
| JP | 2014-008840 A | 1/2014 |
| JP | 2017-193290 A | 10/2017 |
| JP | 2018-030448 A | 3/2018 |

* cited by examiner

*Primary Examiner* — Dennis H Pedder
(74) *Attorney, Agent, or Firm* — Dinsmore & Shohl LLP

(57) ABSTRACT

A vehicle lower section structure includes a battery unit that is disposed below a floor panel, a sliding door that is provided to a side section of a vehicle body, and a lower hinge that is attached to a lower portion of the sliding door, that supports the sliding door with respect to the vehicle body such that the sliding door is capable of sliding in a vehicle front-rear direction, and that is disposed further toward a vehicle upper side than the battery unit.

12 Claims, 5 Drawing Sheets

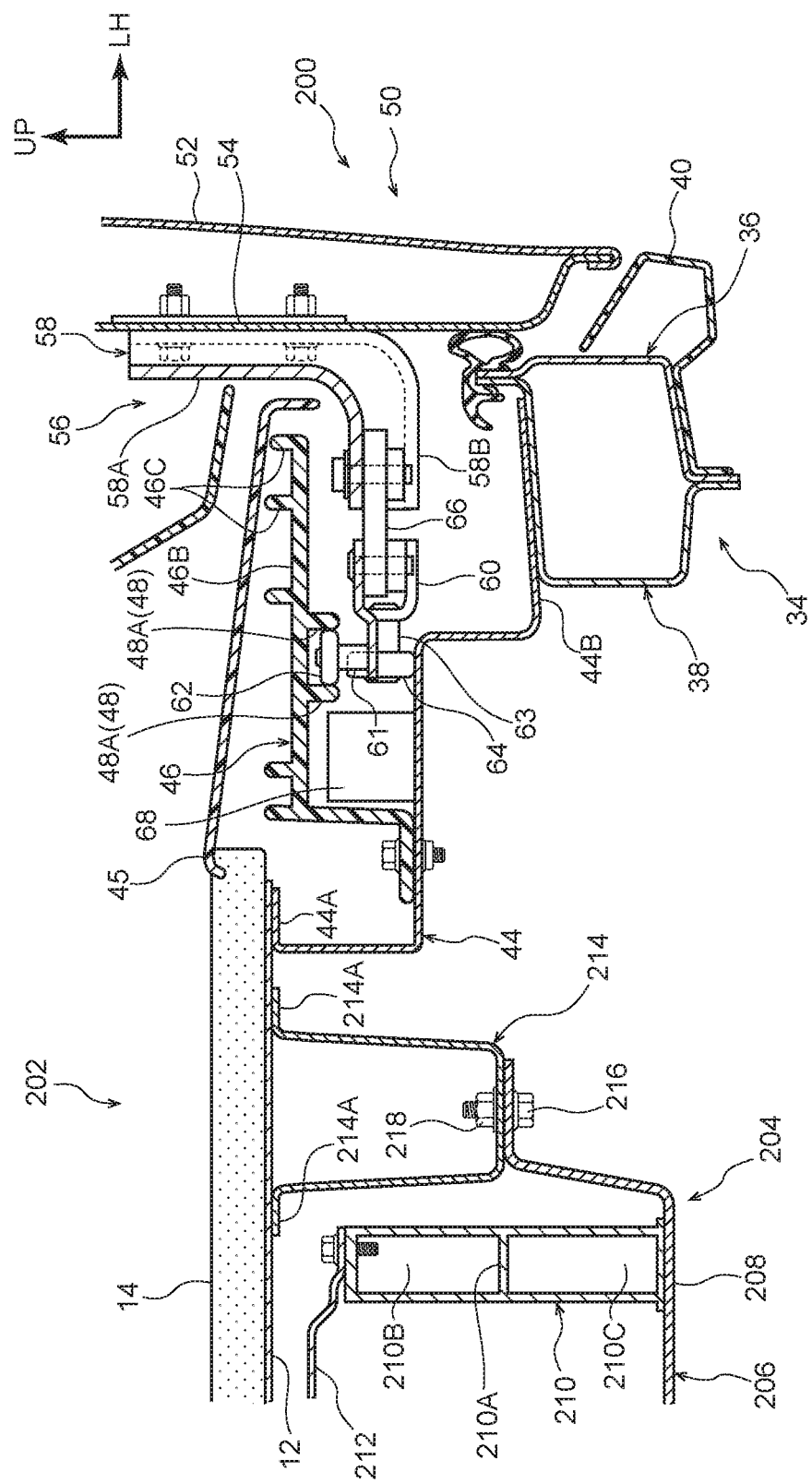

VEHICLE LOWER SECTION STRUCTURE

CROSS-REFERENCE TO RELATED APPLICATION

This application claims priority under 35 USC 119 from Japanese Patent Application No. 2018-112974, filed on Jun. 13, 2018, the disclosure of which is incorporated by reference herein.

BACKGROUND

Technical Field

The present disclosure relates to a vehicle lower section structure.

Related Art

Japanese Patent Application Laid-Open (JP-A) No. 2014-008840 discloses a sliding door structure including a sliding door provided to a side section of a vehicle body so as to slide in a vehicle front-rear direction. The sliding door is provided with a lower hinge coupled to the vehicle body to enable the sliding door to be opened and closed. The lower hinge projects from the sliding door toward the vehicle body side.

In vehicles such as electric cars, a battery unit may be installed below a floor panel. However, in the structure disclosed in JP-A No. 2014-008840, a battery unit is installed below a vehicle floor panel, but no consideration is given to suppressing interference between a lower hinge and the battery unit when the lower hinge intrudes toward a vehicle width direction inner side in a side collision of the vehicle.

SUMMARY

The present disclosure provides a vehicle lower section structure that may protect a battery unit in a side collision of a vehicle including a sliding door at a side section of a vehicle body and a battery unit installed below a floor panel.

A vehicle lower section structure according to a first aspect includes a battery unit disposed at a vehicle lower side of a floor panel, a sliding door provided at a side section of a vehicle body; and a lower hinge that is disposed further toward a vehicle upper side than the battery unit, that is attached to a lower portion of the sliding door, and that supports the sliding door with respect to the vehicle body so as to be slidable in a vehicle front-rear direction.

In the vehicle lower section structure according to the first aspect, the battery unit is disposed at the vehicle lower side of the floor panel. The sliding door is provided to the side section of the vehicle body, and the lower hinge is attached to the lower portion of the sliding door. The sliding door is supported with respect to the vehicle body by the lower hinge, such that the sliding door is slidable in the vehicle front-rear direction. The lower hinge is disposed further toward the vehicle upper side than the battery unit. Thus, the interference between the lower hinge and the battery unit may be suppress, even if the lower hinge intrudes toward the vehicle width direction inner side together with the sliding door in a side collision of the vehicle.

In a second aspect of the present disclosure, in the above first aspect, wherein the battery unit may disposed so as to overlap with the lower hinge as viewed from above the vehicle.

In the vehicle lower section structure according to the second aspect, the battery unit is disposed below the lower hinge, thereby configuration components of the battery unit, such as battery cells and a cooling device, may be dispose in a region below the lower hinge.

In a third aspect of the present disclosure, in the above first aspect or second aspect, the vehicle body may be provided with a step used when entering or leaving the vehicle; and a lower guide to guide the lower hinge may be integrally formed at the step such that the lower hinge is movable in the vehicle front-rear direction.

In the vehicle lower section structure according to the third aspect, the step and the lower guide are integrally formed to each other, such that there is no need to attach a separate lower guide to the step.

In a fourth aspect of the present disclosure, in the above third aspect, wherein an opening/closing device of the sliding, door may be attached to the step, and the opening/closing device may be disposed further toward the vehicle upper side than the battery unit.

In the vehicle lower section structure according to the fourth aspect, interference between the opening/closing device and the battery unit may be suppressed, even if the opening/closing device of the sliding door intrudes toward the vehicle width direction inner side in a collision such as a side collision of the vehicle.

In a fifth aspect of the present disclosure, in any one of the first aspect to the fourth aspect, may further include a side member that is disposed at a lower face side or an upper face side of the floor panel so as to configure a closed cross-section with the floor panel and so as to be disposed further toward the vehicle upper side than the battery unit.

In the vehicle lower section structure according to the fifth aspect, the side member is disposed further toward the vehicle upper side than the battery unit, thereby the battery unit may be disposed at the vehicle lower side of the side member.

In a sixth aspect of the present disclosure, in any one of the first aspect to the fourth aspect, wherein a shock absorbing member may be disposed further toward a vehicle width direction outer side than the battery unit.

In the vehicle lower section structure according, to the sixth aspect, if collision load from the vehicle width direction outer side is input in a side collision, at least part of the collision load is absorbed by the shock absorbing member. This thereby enables collision load to be suppressed from being input to the battery unit that is further toward the vehicle width direction inner side than the shock absorbing member.

In a seventh aspect of the present disclosure, in the sixth aspect, wherein a rocker may extend along the vehicle front-rear direction at a lower section of the vehicle body, and the shock absorbing member may be disposed within a cross-section of the rocker.

In the vehicle lower section structure according, to the seventh aspect, the shock absorbing member is disposed within the cross-section of the rocker, such that there is no need to secure a separate space in which to dispose the shock absorbing member between the battery unit and the sliding door.

In an eighth aspect of the present disclosure, in the sixth aspect, wherein a peripheral wall may be provided at a side portion of the battery unit, the peripheral wall being partitioned into a plurality of closed cross-sections arranged along a vehicle vertical direction by an up-down partitioning wall extending in the vehicle width direction, and the shock absorbing member may be disposed at the vehicle width direction outer side of the peripheral wall, and is partitioned into a plurality of closed cross-sections arranged along the vehicle width direction by a left-right partitioning wall extending in the vehicle vertical direction.

In the vehicle lower section structure according to the eighth aspect, the shock absorbing member is partitioned in the vehicle width direction by the left-right partitioning wall, such that the respective closed cross-sections deform in a side collision, shock absorbing performance may be improved. The peripheral wall of the battery unit is partitioned into upper and lower closed cross-sections by the up-down partitioning wall, thereby load-withstand performance with respect to load acting in the vehicle width direction may be improved.

As described above, in the vehicle lower section structure of the first aspect, the battery unit is protected in a collision such as a side collision in a vehicle including the sliding door at the side section of the vehicle body and mounted with the battery unit below the floor panel.

In the vehicle lower section structure of the second aspect, the battery installation capacity is increased without increasing the width of the vehicle, in comparison to configurations in which the battery unit is disposed further to the vehicle width direction inner side than the lower hinge as viewed from above the vehicle.

In the vehicle lower section structure of the third aspect, the number of components is reduced.

In the vehicle lower section structure of the fourth aspect, collision load is suppressed from being input from the opening/closing device of the sliding door to the battery unit in a collision such as a side collision.

In the vehicle lower section structure of the fifth aspect, the battery installation capacity is increased without increasing the width of the vehicle, in comparison to configurations in which the side member extends further toward the vehicle lower side than an upper end portion of the battery unit.

In the vehicle lower section structure of the sixth aspect, the protection performance of the battery unit in a side collision is improved.

In the vehicle lower section structure of the seventh aspect, space is saved while improving the protection performance of the battery unit.

In the vehicle lower section structure of the eighth aspect, the shock absorbing performance by the shock absorbing member is improved, and the load-withstand performance of the battery unit is also improved.

BRIEF DESCRIPTION OF THE DRAWINGS

Exemplary embodiment of the present disclosure will be described in detail based on the following figures, wherein:

FIG. 5 is a cross-section corresponding to FIG. 1, illustrating a lower section of a vehicle applied with a vehicle lower section structure according to a comparative example.

DETAILED DESCRIPTION

Explanation follows regarding a vehicle lower section structure according to an exemplary embodiment, with reference to the drawings. Note that in the respective drawings, the arrow UP indicates a vehicle upper side, the arrow FR indicates a vehicle front side, and the arrow LH indicates a vehicle width direction (left-right direction) left side, as appropriate. In the following explanation, unless specifically stated otherwise, reference to the front, rear, up, down, left, and right directions refers to the front and rear in a vehicle front-rear direction, up and down in a vehicle vertical direction, and left and right when facing in the direction of travel.

Figure 1:
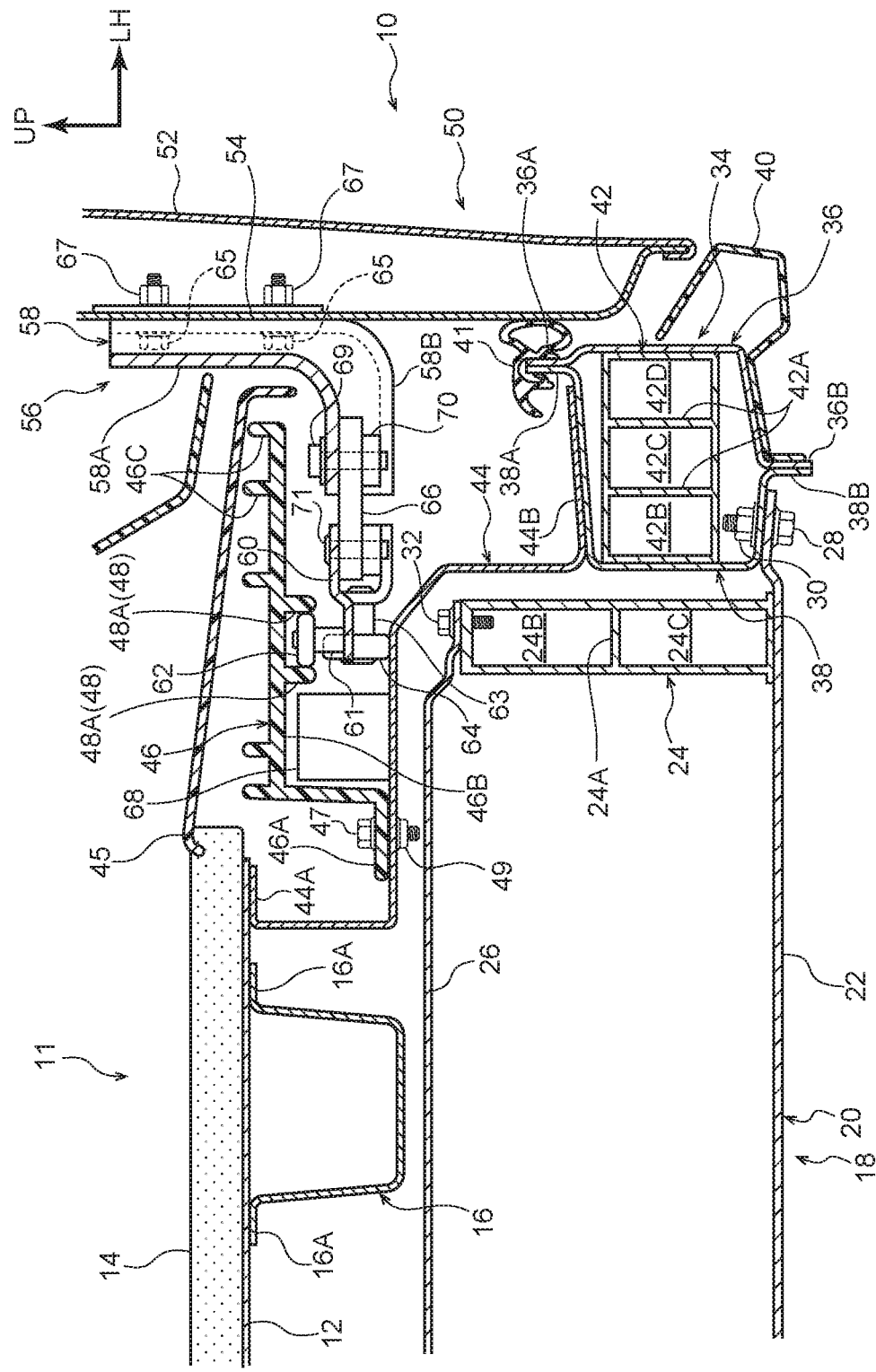
FIG. 1 is a cross-section illustrating a lower section of a vehicle applied with a vehicle lower section structure according to an exemplary embodiment.

As illustrated in FIG. 1, a vehicle body 11 of a vehicle 10 applied with the vehicle lower section structure according to the present exemplary embodiment includes a floor panel 12 configuring a floor surface of a vehicle cabin. The floor panel 12 extends in the vehicle width direction and the vehicle front-rear direction with its plate thickness direction along the vehicle vertical direction. A floor carpet 14 is laid on an upper face of the floor panel 12. A side member 16 is provided at a lower face side of the floor panel 12.

The side member 16 is formed with a substantially hat-shaped cross-section profile opening toward the vehicle upper side as viewed along the vehicle front-rear direction, and includes flanges 16A at both vehicle width direction ends of the side member 16 that are overlaid on and joined to the lower face of the floor panel 12. A closed cross-section is thus configured between the side member 16 and the floor panel 12. The side member 16 extends along the vehicle front-rear direction so as to reinforce the floor panel 12.

A battery unit 18 is disposed below the floor panel 12. The battery unit 18 is provided spanning the entire region below the floor panel 12. The side member 16 is thus disposed at the vehicle upper side of the battery unit 18 and part of the battery unit 18 is disposed overlapping the side member 16 as viewed from the vehicle upper side.

The battery unit 18 includes a case 20 serving as an outer shell. Plural battery cells, a wire harness, a cooling device, and so on, none of which are illustrated in the drawings, are housed in the case 20. Drive power from the battery unit 18 can be supplied to a motor, not illustrated in the drawings.

The case 20 is configured including a bottom wall 22, a peripheral wall 24, and a cover 26. The bottom wall 22 extends in the vehicle width direction and the vehicle front-rear direction with its plate thickness direction along the vehicle vertical direction. Both vehicle width direction end portions of the bottom wall 22 are fastened to rockers 34, described later, by bolts 28 and nuts 30. Although not illustrated in the drawings, the bottom wall 22 is fastened to the rockers 34 at predetermined spacings along the vehicle front-rear direction.

The peripheral wall 24 projects upward from an outer peripheral portion of the bottom wall 22. The peripheral wall 24 is formed in a frame shape following the outer peripheral portion of the bottom wall 22 in plan view, and is formed by extrusion molding a metal such as aluminum as an example in the present exemplary embodiment. A portion of the peripheral wall 24 configuring a side portion of time battery unit 18 has a closed cross-section structure as viewed along the vehicle front-rear direction, and is partitioned into plural (two) closed cross-sections 24B, 24C arranged along the vehicle vertical direction by an up-down partitioning wall 24A extending in the vehicle width direction. Note that although not illustrated in the drawings, the right side of the vehicle has a similar structure.

The cover 26 is provided to an upper portion of the battery unit 18. The cover 26 is formed in a substantially rectangular shape corresponding to the external profile of the peripheral wall 24, with its plate thickness direction along the vehicle vertical direction. An outer peripheral end portion of the cover 26 is fastened to an upper face of the peripheral wall 24 by bolts 32.

The rockers 34 are provided at the vehicle width direction outer sides of the battery unit 18 configured as described above. The rockers 34 are positioned at a lower section of the vehicle body 11, and are each configured including a rocker outer panel 36 and a rocker inner panel 38.

The rocker outer panel 36 is positioned at the vehicle width direction outer side, and is formed in substantially a crank shape as viewed along the vehicle front-rear direction. More specifically, the rocker outer panel 36 extends from an outer side upper flange 36A at an upper end portion toward the vehicle lower side, and a lower portion of the rocker outer panel 36 is bent toward the vehicle width direction inner side. An outer side lower flange 36B extends from a vehicle width direction inner side end portion of the rocker outer panel 36 toward the vehicle lower side.

The rocker inner panel 38 is positioned at the vehicle width direction inner side, and is formed with a substantially hat-shaped cross-section profile opening toward the vehicle width direction outer side as viewed along the vehicle front-rear direction. An inner side upper flange 38A extending in the vehicle vertical direction is formed to an upper end portion of the rocker inner panel 38. The inner side upper flange 38A is joined to the outer side upper flange 36A of the rocker outer panel 36 in a superimposed state. A weather strip 41 is attached to the outer side upper flange 36A and the inner side upper flange 38A. The weather strip 41 forms a seal with respect to a sliding door 50, described later.

An inner side lower flange 38B extending in the vehicle vertical direction is formed to a lower end portion of the rocker inner panel 38. The inner side lower flange 38B is joined to the outer side lower flange 36B of the rocker outer panel 36 in a superimposed state. The rocker 34 is configured with a closed cross-section structure in this manner.

A rocker molding 40 is provided at an outer side of the rocker 34. The rocker molding 40 is formed from resin, and is attached to the rocker outer panel 36 using clips or the like, not illustrated in the drawings, so as to cover a lower portion of the rocker outer panel 36 from the vehicle width direction outer side.

A shock absorbing member 42 is disposed inside the closed cross-section of the rocker 34. The shock absorbing member 42 is disposed between the battery unit 18 and the sliding door 50, and extends along the vehicle front-rear direction following the rocker 34. In the present exemplary embodiment, as an example, the shock absorbing member 42 is formed by extrusion molding a metal such as aluminum.

The shock absorbing member 42 has a closed cross-section structure as viewed along the vehicle front-rear direction, and is partitioned into plural (three) closed cross-sections 42B, 42C, 42D arranged along the vehicle width direction by two left-right partitioning walls 42A extending in the vehicle vertical direction.

A step under-panel 44 is provided between the floor panel 12 and the rocker 34. The floor panel 12 and the rocker 34 are coupled together by the step under-panel 44. An upper end portion of the step under-panel 44 is configured by an upper flange 44A bent so as to follow the lower face of the floor panel 12, and the upper flange 44A is joined to the floor panel 12.

The step under-panel 44 extends from the upper flange 44A toward the vehicle lower side, and then extends toward the vehicle width direction outer side following the cover 26 of the battery unit 18. The step under-panel 44 then extends from a position further toward the vehicle width direction outer side than the peripheral wall 24 of the battery unit 18 toward the vehicle lower side, and a lower end portion of the step under-panel 44 is configured by a lower flange 44B that is bent so as to follow the rocker inner panel 38. The lower flange 44B is superimposed on and joined to the rocker inner panel 38. In this manner, the step under-panel 44 is formed in a shape that avoids the battery unit 18.

A step 46 that is used when an occupant enters or leaves the vehicle is attached to the step under-panel 44. The step 46 is formed with a substantially L-shaped profile as viewed along the vehicle front-rear direction, and a lower end portion of the step 46 is configured by a fixing portion 46A that is bent so as to follow the step under-panel 44. The fixing portion 46A is fastened to the step under-panel 44 by bolts 47 and nuts 49.

The step 46 extends from the fixing portion 46A toward the vehicle upper side, and then extends toward the vehicle width direction outer side. A step body 46B extending in the vehicle width direction is provided with reinforcing ribs 46C. Plural of the ribs 46C are provided (five are illustrated in FIG. 1) projecting from the step body 46B toward the vehicle upper side.

A lower face side of the step body 46B is provided with a lower guide 48. The lower guide 48 is configured including a pair of left and right guide tabs 48A projecting from the step body 46B toward the vehicle lower side. The guide tabs 48A are integrally formed to the step body 46B (the step 46). Each of the pair of guide tabs 48A extend in the vehicle front-rear direction so as to follow the step body 46B, and a guide roller 62 of a lower hinge 56, described later, enters between the pair of guide tabs 48A. In this manner, the lower guide 48 guides the lower hinge 56 such that the lower hinge 56 is capable of moving in the vehicle front-rear direction.

A resin scuff plate 45 is provided above the step 46. The scuff plate 45 extends from a vehicle width direction end portion of the floor panel 12 as far as a vehicle width direction end portion of the step body 46B, and is attached to the step 46 by clips or the like, not illustrated in the drawings.

An opening/closing device 68 of the sliding door 50 is attached to the step 46. The opening/closing device 68 is a component including a motor, pulleys, and the like needed in order to open and close the sliding door 50 automatically. The opening/closing device 68 is disposed on the step under-panel 44. Namely, the opening/closing device 68 is disposed further toward the vehicle upper side than the battery unit 18.

Sliding Door 50 Configuration

Figure 2:
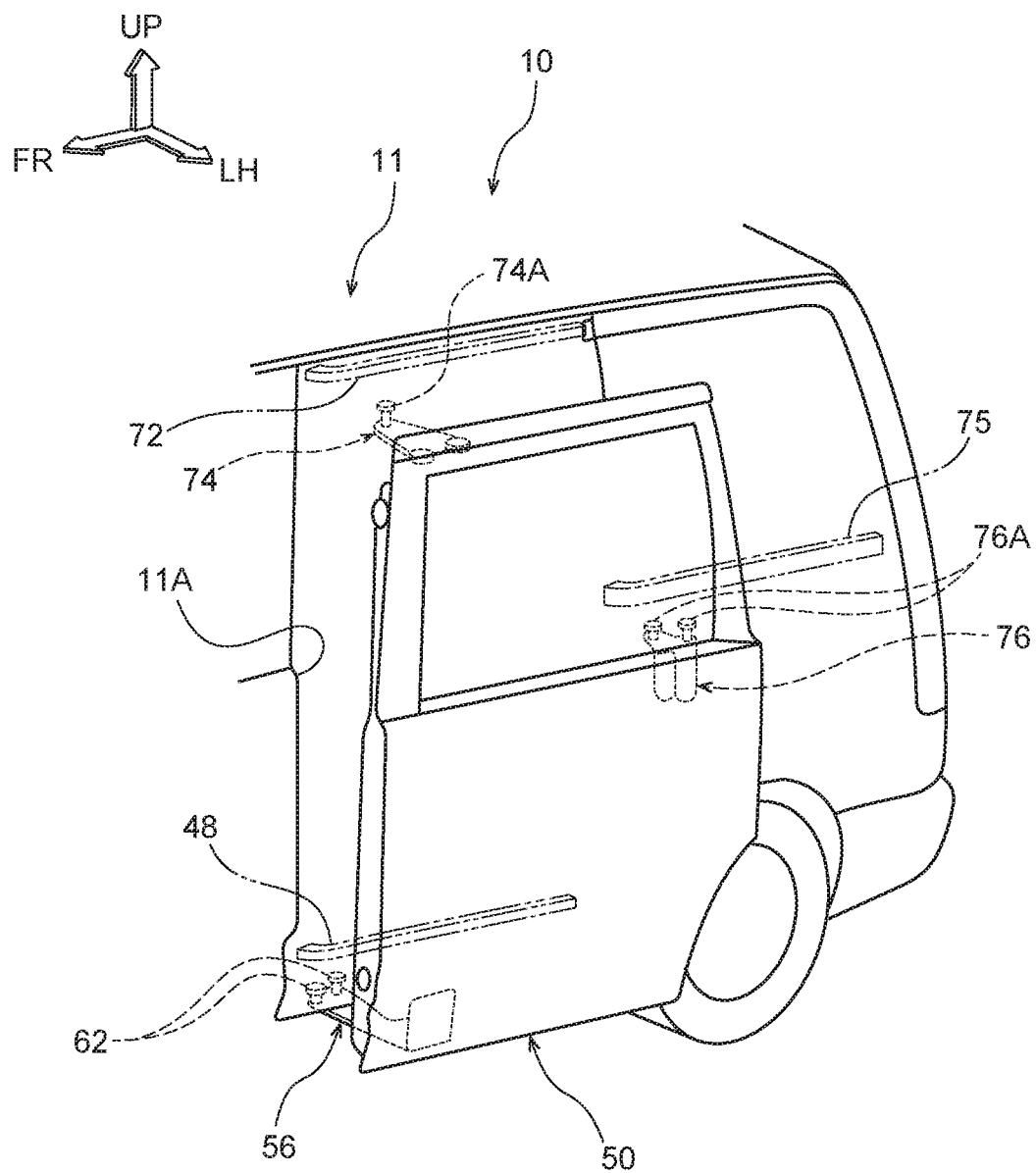
FIG. 2 is a perspective view illustrating a rear section of a vehicle applied with a vehicle lower section structure according to an exemplary embodiment, as viewed from an outer side.

Explanation follows regarding configuration of the sliding door 50. As illustrated in FIG. 2, the sliding door 50 is provided at a side section of the vehicle body 11, and is capable of opening and closing off an opening 11A thrilled in the side section of the vehicle body 11 for an occupant to enter or leave the vehicle.

The vehicle body 11 is provided with an upper guide 72, a center guide 75, and the lower guide 48. The upper guide 72 is provided at an upper section of the vehicle body 11 and extends along the vehicle front-rear direction. The center guide 75 is provided at a vehicle vertical direction intermediate section of the vehicle body 11, and extends along the vehicle front-rear direction. The lower guide 48 is provided at a lower section of the vehicle body 11, and extends along the vehicle front-rear direction.

An upper hinge 74 is attached to an upper portion of the sliding door 50. A guide roller 74A provided to the upper hinge 74 engages with the upper guide 72. A center hinge 76 is attached to a vehicle vertical direction intermediate portion of the sliding door 50. A guide roller 76A provided to the center hinge 76 is engaged with the center guide 75. The lower hinge 56 is attached to a lower portion of the sliding door 50. The guide roller 62 provided to the lower hinge 56 engages with the lower guide 48. In this manner, the sliding door 50 is supported so as to be capable of moving in the vehicle front-rear direction with respect to the vehicle body 11. Note that in FIG. 2, for ease of explanation, the respective guides and guide rollers are illustrated as if separated from each other; however, in reality, the guide rollers enter the guides.

As illustrated in FIG. 1, the sliding door 50 is configured including a door outer panel 52 on the vehicle width direction outer side and a door inner panel 54 on the vehicle width direction inner side. Peripheral edge portions of the door outer panel 52 and the door inner panel 54 are joined together by hemming.

The lower hinge 56 is attached to the lower portion of the sliding door 50. The lower hinge 56 is attached to a vehicle width direction inner side face of the door inner panel 54, and is formed in substantially an L-shape as viewed along the vehicle front-rear direction. The lower hinge 56 is configured including a hinge body 58, a base 60, the guide roller 62, and a load roller 64.

The hinge body 58 is configured including a fixing portion 58A extending in the vehicle vertical direction so as to follow the door inner panel 54, and a base attachment portion 58B extending from a lower end portion of the fixing portion 58A toward the vehicle width direction inner side.

The fixing portion 58A is formed with a substantially hat-shaped cross-section profile opening toward the vehicle width direction outer side, and is fastened to the door inner panel 54 by bolts 65 and nuts 67. The base attachment portion 58B is formed with a substantially hat-shaped cross-section profile opening toward the vehicle lower side, and extends as far as below a leading end portion of the step 46. One end portion of a coupling member 66 is fixed to a lower face side of the base attachment portion 58B by bolts 69 and nuts 70.

The coupling member 66 is an elongated member extending in the vehicle width direction with its plate thickness direction along the vehicle vertical direction. The base 60 is attached to another end portion of the coupling member 66 by a pin 71 such that the base 60 is capable of swinging.

The base 60 extends from the coupling member 66 toward the vehicle width direction inner side. A shaft 61 with its axial direction along the vehicle vertical direction is provided at a leading end portion of the base 60. The guide roller 62 is rotatably attached to the shaft 61, and the guide roller 62 enters between the pair of guide tabs 48A configuring the lower guide 48.

The base 60 is also provided with a shaft 63 with its axial direction along the vehicle front-rear direction. The load roller 64 is rotatably attached to the shaft 63. The load roller 64 contacts the step under-panel 44, and the lower hinge 56 is supported by the step under-panel 44 through the load roller 64.

As described above, the sliding door 50 is supported by the lower hinge 56 so as to be capable of sliding in the vehicle front-rear direction with respect to the vehicle body 11. Note that the lower hinge 56 is disposed further toward the vehicle upper side than the battery unit 18. Namely, the lower hinge 56 and the battery unit 18 are disposed at positions that do not overlap as viewed along the vehicle width direction.

The battery unit 18 is disposed at a position overlapping the lower hinge 56 as viewed from above the vehicle. In the present exemplary embodiment, in a state in which the sliding door 50 is closed, the base 60 of the lower hinge 56 is disposed above the peripheral wall 24 of the battery unit 18. The base 60 and the peripheral wall 24 therefore overlap as viewed from above the vehicle.

Operation

Explanation follows regarding operation of the present exemplary embodiment.

In the vehicle 10 applied with the vehicle lower section structure according to the present exemplary embodiment, the lower hinge 56 is disposed further toward the vehicle upper side than the battery unit 18. Accordingly, even if the lower hinge 56 intrudes toward the vehicle width direction inner side together with the sliding door 50 in a side collision of the vehicle, the lower hinge 56 is suppressed from contacting the battery unit 18. Namely, interference between the lower hinge 56 and the battery unit 18 is suppressed, and the battery unit 18 is thereby protected.

Explanation follows regarding the above operation, drawing comparisons to a comparative example illustrated in FIG. 5. Note that configurations similar to those of the present exemplary embodiment are allocated the same reference numerals, and explanation thereof is omitted as appropriate. As illustrated in FIG. 5, a vehicle body 202 of a vehicle 200 applied with a vehicle lower section structure of the comparative example is provided with the floor panel 12 configuring the floor surface of the vehicle cabin, and side members 214 are provided at a lower face side of the floor panel 12.

Each of the side members 214 is formed with a substantially hat-shaped cross-section profile opening toward the vehicle upper side as viewed along the vehicle front-rear direction, and flanges 214A on both vehicle width direction sides of the side member 214 are superimposed on and joined to the lower face of the floor panel 12. Note that the side member 214 of the comparative example is formed with a greater vehicle vertical direction length than the side member 16 of the present exemplary embodiment.

A battery unit 204 is disposed below the floor panel 12. The battery unit 204 is attached to the side member 214.

A case 206 of the battery unit 204 is configured including a bottom wall 208, a peripheral wall 210, and a cover 212. The bottom wall 208 extends in the vehicle width direction and the vehicle front-rear direction with its plate thickness direction along the vehicle vertical direction. Both vehicle width direction end portions of the bottom wall 208 are fastened to the respective side members 214 by bolts 216 and nuts 218.

The peripheral wall 210 is formed in a frame shape following an outer peripheral portion of the bottom wall 208. A portion of the peripheral wall 210 configuring a side portion of the battery unit 204 has a closed cross-section structure as viewed along the vehicle front-rear direction, and is partitioned into plural (two) closed cross-sections 210B, 210C arranged along the vehicle vertical direction by an up-down partitioning wall 210A extending in the vehicle width direction.

The cover 212 is formed in a substantially rectangular shape corresponding to the external profile of the peripheral wall 210, with its plate thickness direction along the vehicle vertical direction. An outer peripheral end portion of the cover 212 is fastened to an upper face of the peripheral wall 210.

Note that an upper portion of the battery unit 204 of the comparative example is disposed at a position overlapping the lower hinge 56 as viewed along the vehicle width direction. Namely, the battery unit 204 is disposed on an extension line of the base attachment portion 58B of the lower hinge 56 extending toward the vehicle width direction inner side.

Moreover, the upper portion of the battery unit 204 of the comparative example is disposed at a position overlapping the step 46 as viewed along the vehicle width direction. Accordingly, in the vehicle 200 applied with the vehicle lower section structure of the comparative example, if load toward the vehicle width direction inner side acts on the sliding door 50 in a side collision, the sliding door 50 and the lower hinge 56 intrude toward the vehicle width direction inner side. This might cause the lower hinge 56 to interfere with the battery unit 204 through the side member 214.

By contrast, in the vehicle 10 applied with the vehicle lower section structure of the present exemplary embodiment, as illustrated in FIG. 1, the lower hinge 56 and the battery unit 18 are disposed at positions that do not overlap each other as viewed along the vehicle width direction. Interference between the lower hinge 56 and the battery unit 18 in a side collision is accordingly suppressed, and the battery unit 18 is thereby protected.

Moreover, in the present exemplary embodiment, the vehicle width direction end portion of the battery unit 18 is disposed at the vehicle lower side of the lower hinge 56. Namely, the battery unit 18 and the lower hinge 56 are disposed so as to overlap each other as viewed from above the vehicle. Accordingly, configuration components of the battery unit 18, such as the battery cells and the cooling device, can be disposed in a region below the lower hinge 56, thereby increasing the battery installation capacity without increasing the width of the vehicle, in comparison to configurations in which the battery unit 18 is disposed further to the vehicle width direction inner side than the lower hinge 56 as viewed from above the vehicle.

Moreover, in the present exemplary embodiment, the step 46 and the lower guide 48 are integrally formed to each other. Accordingly, there is no need to attach a separate lower guide 48 to the step body 46B. This also reduces the number of components. In particular, in the present exemplary embodiment, the step 46 and the lower guide 48 are positioned further toward the vehicle upper side than the lower hinge 56, thereby suppressing interference between the step 46 and the battery unit 18 in a side collision of the vehicle.

In the present exemplary embodiment, the opening/closing device 68 of the sliding door 50 is also disposed further toward the vehicle upper side than the battery unit 18. Accordingly, interference between the opening/closing device 68 and the battery unit 18 is suppressed, even if the opening/closing device 68 intrudes toward the vehicle width direction inner side in a side collision of the vehicle 10.

Moreover, in the present exemplary embodiment, the side member 16 is provided at the lower face side of the floor panel 12, but the side member 16 is also disposed further toward the vehicle upper side than the battery unit 18. This thereby enables the battery unit 18 to be disposed at the vehicle lower side of the side member 16, thereby increasing the battery installation, capacity without increasing the width of the vehicle, in comparison to configurations in which the side member 16 extends further toward the vehicle lower side than the upper end portion of the battery unit 18.

Moreover, in the present exemplary embodiment, the shock absorbing member 42 is disposed between the battery unit 18 and the sliding door 50. Accordingly, if collision load is input to the sliding door 50 in a side collision, at least part of the collision load can be absorbed by the shock absorbing member 42. This thereby enables collision load to be suppressed from being input to the battery unit 18 that is further toward the vehicle width direction inner side than the shock absorbing member 42, thereby improving the protection performance of the battery unit 18 in a side collision.

In particular, in the present exemplary embodiment, the shock absorbing member 42 is disposed within the cross-section of the rocker 34. There is accordingly no need to secure a separate space in which to dispose the shock absorbing member 42. Namely, the shock absorbing member 42 can be disposed while securing a space between the battery unit 18 and the sliding door 50.

Moreover, in the present exemplary embodiment, the closed cross-section of the shock absorbing member 42 is partitioned in the vehicle width direction by the left-right partitioning walls 42A. Accordingly, in a side collision, the closed cross-section 42D on the collision side is crushed first, absorbing shock, after which the closed cross-section 42C is crushed. The closed cross-section 42B is then crushed, such that the closed cross-sections can be crushed sequentially, enabling the shock absorbing performance to be improved.

The peripheral wall 24 of the battery unit 18 is partitioned into upper and lower closed cross-sections by the up-down partitioning wall 24A. Namely, since the up-down partitioning wall 24A extends in the vehicle width direction, load-withstand performance with respect to load acting in the vehicle width direction in a side collision can be improved. This thereby enables the shock absorbing performance by the shock absorbing member 42 to be improved, and also enables the load-withstand performance of the battery unit 18 to be improved.

Note that in the exemplary embodiment described above, the shock absorbing member 42 is disposed within the cross-section of the rocker 34. However, there is no limitation thereto, and the structure of a modified example illustrated in FIG. 3 may be adopted.

Modified Example

Figure 3:
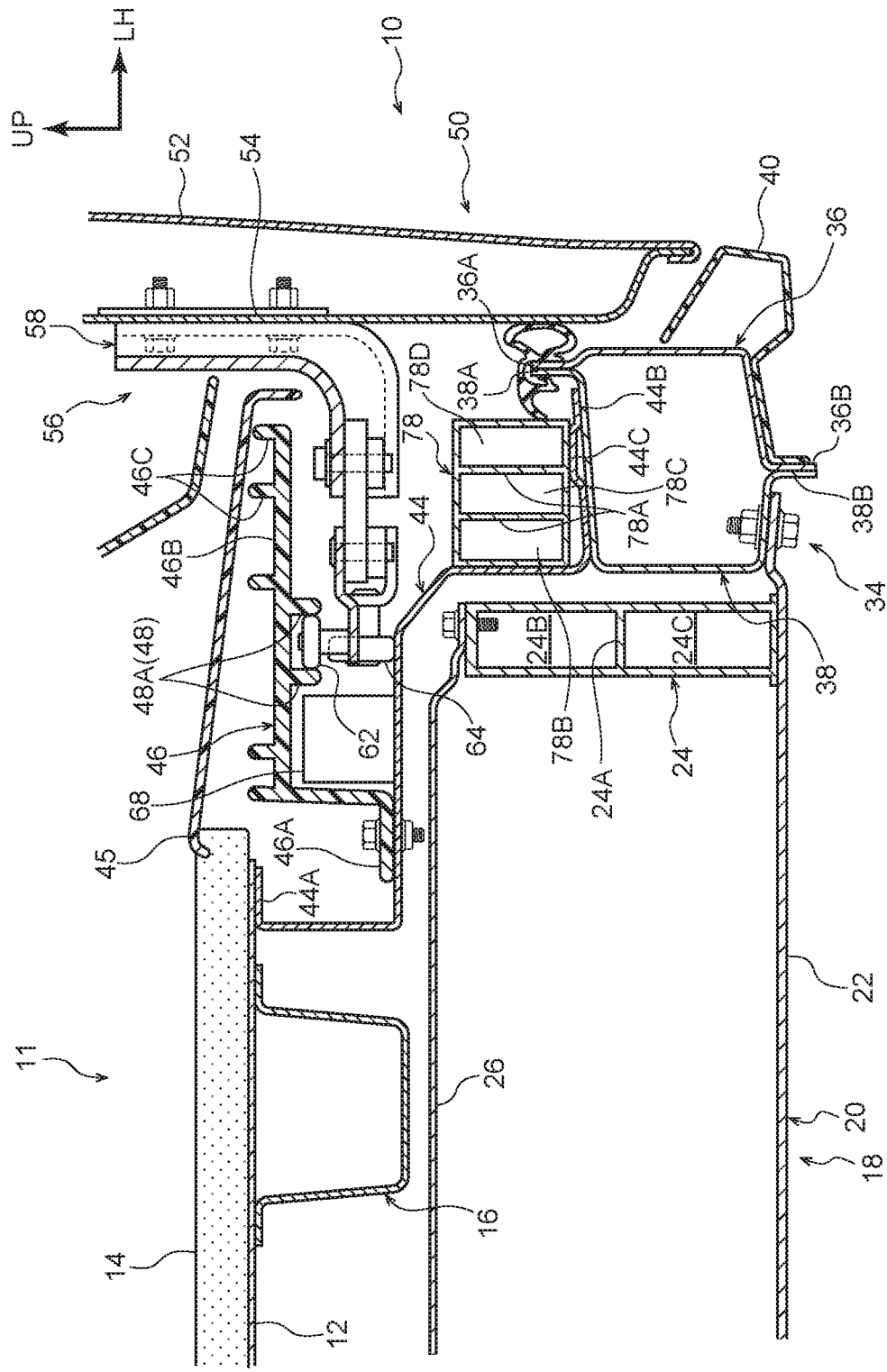
FIG. 3 is a cross-section corresponding to FIG. 1, illustrating a modified example of a vehicle lower section structure according to an exemplary embodiment.

As illustrated in FIG. 3, in the present modified example, a shock absorbing member 78 is provided above the rocker 34. More specifically, the shock absorbing member 78 is disposed between the battery unit 18 and the sliding door 50, and is attached to the step under-panel 44.

A protrusion 44C that protrudes toward the vehicle upper side is formed to the lower flange 44B of the step under-panel 44. The shock absorbing member 78 is fixed onto the protrusion 44C. An upper face of the protrusion 44C extends substantially in a horizontal direction, and the shock absorbing member 78 is supported by the protrusion 44C and a vertical wall of the step under-panel 44 (a portion extending from a vehicle width direction inner side end portion of the lower flange 44B toward the vehicle upper side). The shock absorbing member 78 is thereby suppressed from tilting.

The shock absorbing member 78 has a similar profile to the shock absorbing member 42 of the above exemplary embodiment. Namely, the shock absorbing member 78 has a closed cross-section structure as viewed along the vehicle front-rear direction, and is partitioned into plural (three) closed cross-sections 78B, 78C, 78D arranged along the vehicle width direction by two left-right partitioning walls 78A extending in the vehicle vertical direction.

In the present modified example, similarly to in the above exemplary embodiment, at least part of the shock in a side collision can be absorbed by the shock absorbing member 78. Moreover, since the shock absorbing member 78 is provided at the exterior of the rocker 34, the shock absorbing member 78 can be attached after the rocker 34 has been formed.

Explanation has been given regarding vehicle lower section structures according to the above exemplary embodiment and the modified example. However, obviously various configurations may be implemented within a range not departing from the spirit of the present disclosure. For example, a step including a shock absorbing structure may be employed. In such cases, shock can be absorbed by both the shock absorbing member 42 and the step in a side collision of the vehicle 10. A structure that is crushed when input with collision load along the vehicle width direction may also be employed as such a shock absorbing structure.

Moreover, in the above exemplary embodiment and the modified example, a shock absorbing member provided with three closed cross-sections arranged along the vehicle width direction is employed. However, there is no limitation thereto, and a shock absorbing member with even more closed cross-sections may be employed. Moreover, configuration may be applied in which the closed cross-section of the rocker 34 is milled with a shock absorbing member formed of foamed resin or the like instead of the shock absorbing member 42.

Moreover, the vehicle lower section structure according to the above exemplary embodiment may be interpreted from another viewpoint. For example, the issue addressed by (the object of) the vehicle lower section structure according to the present exemplary embodiment may be interpreted as being to "increase battery installation capacity without increasing the width of the vehicle".

When the issue is interpreted in the above manner, the disclosure serving as a manner of addressing this issue may, for example, be described as follows:
A vehicle lower section structure including:
 a battery unit that is disposed at a vehicle lower section;
 a sliding door that is provided to a side section of a vehicle body; and
 a lower hinge that extends in a vehicle width direction, and that supports the sliding door with respect to the vehicle body such that the sliding door is capable of sliding in a vehicle front-rear direction,
 the lower hinge being disposed either further toward a vehicle upper side than the battery unit or further toward a vehicle lower side than the battery unit.

In the above configuration, since the lower hinge extending in the vehicle width direction is disposed further toward the vehicle upper side or the vehicle lower side than the battery unit, the battery unit can be enlarged toward the vehicle width direction outer side. As a result, the battery installation capacity can be increased without increasing the width of the vehicle, in comparison to configurations in which the lower hinge and the battery unit are disposed so as to overlap each other as viewed along the vehicle width direction.

Explanation follows regarding a structure provided with the configuration described above as a reference example, with reference to the drawings. Note that content similar to that of the present exemplary embodiment is allocated the same reference numerals, and explanation thereof is omitted as appropriate.

Reference Example

Figure 4:
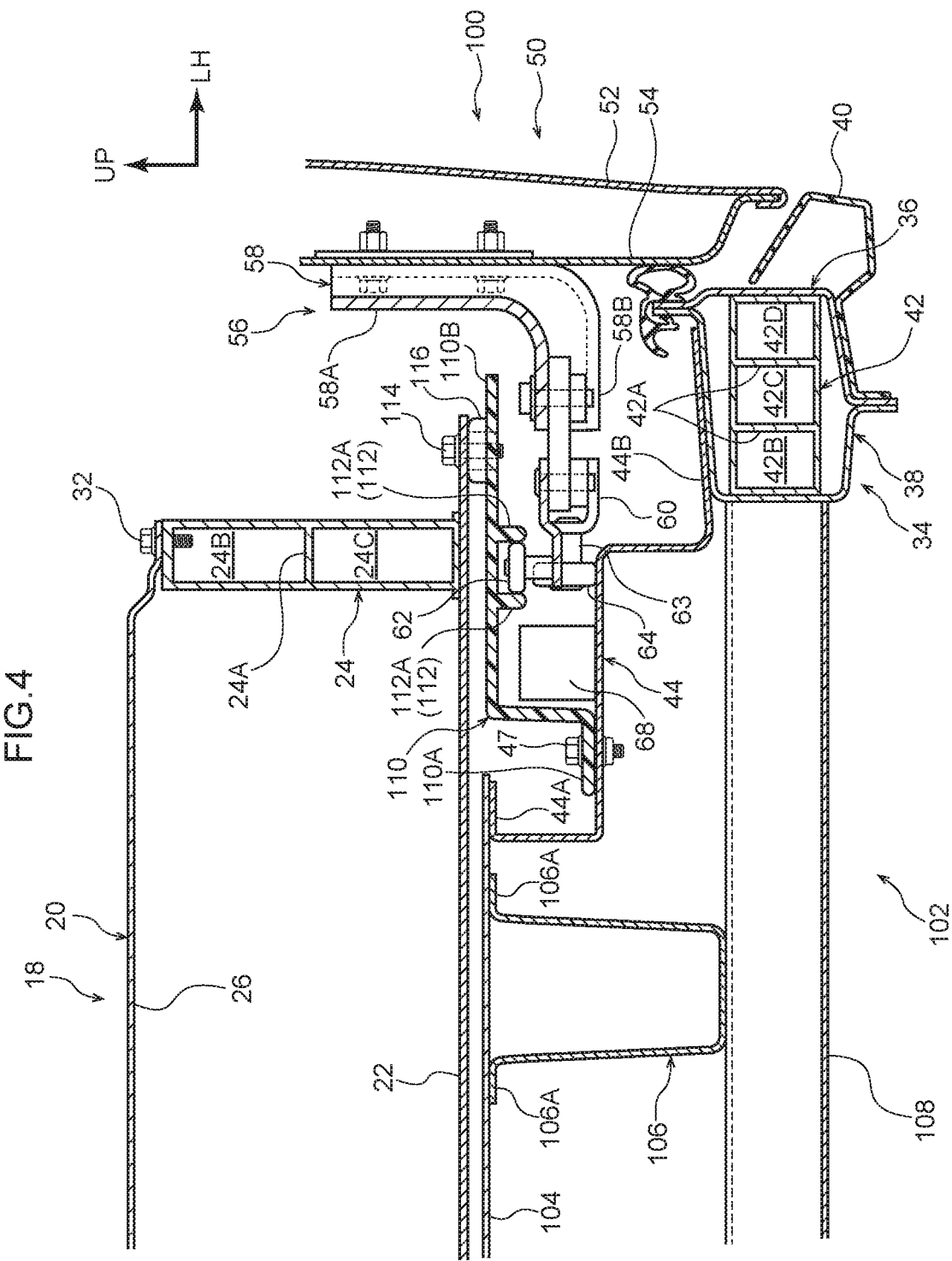
FIG. 4 is a cross-section corresponding to FIG. 1, illustrating a lower section of a vehicle applied with a vehicle lower section structure according to a reference example.

As illustrated in FIG. 4, a vehicle body 102 of a vehicle 100 applied with a vehicle lower section structure according to the reference example includes a floor panel 104 configuring a floor surface of a vehicle cabin. The floor panel 104 extends in the vehicle width direction and the vehicle front-rear direction with its plate thickness direction along the vehicle vertical direction. A side member 106 is provided at a lower face side of the floor panel 104.

The side member 106 is formed with a substantially hat-shaped cross-section profile opening toward the vehicle upper side as viewed along the vehicle front-rear direction, and blames 106A on both vehicle width direction sides of the side member 106 are superimposed on and joined to the lower face of the floor panel 104.

The step under-panel 44 is provided between the side member 106 and the sliding door 50. An upper end portion of the step under-panel 44 configures the upper flange 44A that is bent so as to follow the lower face of the floor panel 104. The upper flange 44A is joined to the floor panel 104.

The step under-panel 44 extends from the upper flange 44A toward the vehicle lower side, and is bent toward the vehicle width direction outer side at a height corresponding to a vehicle vertical direction intermediate portion of the side member 106. The step under-panel 44 then extends toward the vehicle lower side from a position further toward the vehicle width direction outer side than the load roller 64 of the lower hinge 56, and a lower end portion of the step under-panel 44 configures the lower flange 44B that is bent so as to follow the rocker inner panel 38. The lower flange 44B is superimposed on and joined to the rocker inner panel 38.

A step 110 used when an occupant enters or leaves the vehicle is attached to the step under-panel 44. The step 110 is formed with a substantially L-shaped profile as viewed along the vehicle front-rear direction, and a lower end portion of the step 110 is configured by a fixing portion 110A that is bent so as to follow the step under-panel 44. The fixing portion 110A is fastened to the step under-panel 44 by bolts 47 and nuts 49.

The step 110 extends from the fixing portion 110A toward the vehicle upper side, and then extends toward the vehicle width direction outer side. A pair of left and right guide tabs 112A project toward the vehicle lower side from a step body 110B extending in the vehicle width direction. The guide tabs 112A configure a lower guide 112.

The pair of guide tabs 112A are integrally formed to the step body 110B (the step 110), and extend along the vehicle front-rear direction following the step body 110B. The guide roller 62 of the lower hinge 56 enters between the pair of guide tabs 112A. The lower guide 112 thereby supports the lower hinge 56 (the sliding door 50) with respect to the vehicle body 102 such that the lower hinge 56 is capable of sliding in the vehicle front-rear direction.

The battery unit 18 is fixed to an upper face side of the step body 110B, such that the battery unit 18 is disposed above the floor panel 104. Accordingly the side member 106 is disposed at the vehicle lower side of the battery unit 18, and part of the battery unit 18 overlaps the side member 106 as viewed from above the vehicle.

The battery unit 18 is disposed in a vehicle lower section, and includes the case 20 serving as an outer shell. Plural battery cells, a wire harness, a cooling device, and the like, none of which are illustrated in the drawings, are housed in the case 20. Drive power from the battery unit 18 can be supplied to a motor, not illustrated in the drawings.

The case 20 is configured including the bottom wall 22, the peripheral wall 24, and the cover 26. The bottom wall 22 extends in the vehicle width direction and the vehicle front-rear direction with its plate thickness direction along the vehicle vertical direction. Both vehicle width direction end portions of the bottom wall 22 are fastened to the corresponding step body 110B by bolts 114. A spacer 116 is attached between the bottom wall 22 and the corresponding step body 110B such that a gap is provided between the bottom wall 22 and the step body 110B.

Note that the step 110 is disposed further toward the vehicle lower side than the battery unit 18. Namely, the step 110 is disposed at a position that does not overlap the battery unit 18 as viewed along the vehicle width direction.

Moreover, the battery unit 18 is disposed at a position overlapping the step 110 and the lower hinge 56 as viewed from above the vehicle. In the present exemplary embodiment, the base 60 of the lower hinge 56 and the lower guide 112 are disposed below the peripheral wall 24 of the battery unit 18 in a state in which the sliding door 50 has been closed.

Due to the above configuration, the step 110 and the lower hinge 56 extending in the vehicle width direction are disposed further toward the vehicle lower side than the battery unit 18, thereby enabling the battery unit 18 to be enlarged toward the vehicle width direction outer side. This thereby enables the battery installation capacity to be increased without increasing the width of the vehicle, in comparison to configurations in which the step 110 and the battery unit 18 are disposed so as to overlap each other as viewed along the vehicle width direction.

Note that in the reference example, the shock absorbing member 42 is provided within the rocker 34 in order to improve collision-withstand performance in a side collision. Moreover, a cross member 108 extending in the vehicle width direction is disposed between the rockers 34, and both end portions of the cross member 108 are respectively joined to the left and right rockers 34 to achieve a structure in which collision load is readily transmitted toward the non-collision side.

What is claimed is:

1. A vehicle lower section structure comprising:
   a battery unit disposed at a vehicle lower side of a floor panel;
   a sliding door provided at a side section of a vehicle body; and
   a lower hinge that is disposed further toward a vehicle upper side than the battery unit, that is attached to a lower portion of the sliding door, and that supports the sliding door with respect to the vehicle body so as to be slidable in a vehicle front-rear direction,
   wherein the battery unit is disposed so as to overlap with the lower hinge as viewed from above the vehicle.

2. The vehicle lower section structure of claim 1, wherein:
   the vehicle body is provided with a step used when entering or leaving the vehicle; and
   a lower guide to guide the lower hinge is integrally formed at the step such that the lower hinge is movable in the vehicle front-rear direction.

3. The vehicle lower section structure of claim 2, wherein:
   an opening/closing device of the sliding door is attached to the step; and
   the opening/closing device is disposed further toward the vehicle upper side than the battery unit.

4. The vehicle lower section structure of claim 1, further comprising a side member that is disposed at a lower face side of the floor panel so as to configure a closed cross-section with the floor panel and so as to be disposed further toward the vehicle upper side than the battery unit.

5. The vehicle lower section structure of claim 1, wherein a shock absorbing member is disposed further toward a vehicle width direction outer side than the battery unit.

6. The vehicle lower section structure of claim 5, wherein:
   a rocker extends along the vehicle front-rear direction at a lower section of the vehicle body; and
   the shock absorbing member is disposed within a cross-section of the rocker.

7. The vehicle lower section structure of claim 5, wherein:
   a peripheral wall is provided at a side portion of the battery unit, the peripheral wall being partitioned into a plurality of closed cross-sections arranged along a vehicle vertical direction by an up-down partitioning wall extending in the vehicle width direction; and
   the shock absorbing member is disposed at the vehicle width direction outer side of the peripheral wall, and is partitioned into a plurality of closed cross-sections arranged along the vehicle width direction by a left-right partitioning wall extending in the vehicle vertical direction.

8. A vehicle lower section structure comprising:
   a battery unit disposed at a vehicle lower side of a floor panel;
   a sliding door provided at a side section of a vehicle body; and
   a lower hinge that is disposed further toward a vehicle upper side than the battery unit, that is attached to a lower portion of the sliding door, and that supports the sliding door with respect to the vehicle body so as to be slidable in a vehicle front-rear direction, wherein:
   the vehicle body is provided with a step used when entering or leaving the vehicle;
   a lower guide to guide the lower hinge is integrally formed at the step such that the lower hinge is movable in the vehicle front-rear direction;
   an opening/closing device of the sliding door is attached to the step; and
   the opening/closing device is disposed further toward the vehicle upper side than the battery unit.

9. The vehicle lower section structure of claim 8, further comprising a side member that is disposed at a lower face side of the floor panel so as to configure a closed cross-section with the floor panel and so as to be disposed further toward the vehicle upper side than the battery unit.

10. The vehicle lower section structure of claim 8, wherein a shock absorbing member is disposed further toward a vehicle width direction outer side than the battery unit.

11. The vehicle lower section structure of claim 10, wherein:
    a rocker extends along the vehicle front-rear direction at a lower section of the vehicle body; and
    the shock absorbing member is disposed within a cross-section of the rocker.

12. The vehicle lower section structure of claim 10, wherein:
- a peripheral wall is provided at a side portion of the battery unit, the peripheral wall being partitioned into a plurality of closed cross-sections arranged along a vehicle vertical direction by an up-down partitioning wall extending in the vehicle width direction; and
- the shock absorbing member is disposed at the vehicle width direction outer side of the peripheral wall, and is partitioned into a plurality of closed cross-sections arranged along the vehicle width direction by a left-right partitioning wall extending in the vehicle vertical direction.

* * * * *

UNITED STATES PATENT AND TRADEMARK OFFICE
CERTIFICATE OF CORRECTION

| | | |
|---|---|---|
| PATENT NO. | : 10,967,912 B2 | Page 1 of 1 |
| APPLICATION NO. | : 16/405170 | |
| DATED | : April 6, 2021 | |
| INVENTOR(S) | : Masaru Toyota | |

It is certified that error appears in the above-identified patent and that said Letters Patent is hereby corrected as shown below:

In Column 2, Line(s) 42, after "according", delete ",".

In Column 2, Line(s) 55, after "according", delete ",".

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*